US006725727B2

United States Patent
Rogers, Jr. et al.

(10) Patent No.: US 6,725,727 B2
(45) Date of Patent: Apr. 27, 2004

(54) TENSION SENSING ASSEMBLY

(75) Inventors: Lloyd W. Rogers, Jr., Shelby Township, MI (US); Lawrence Easton, Walled Lake, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/164,026

(22) Filed: Jun. 6, 2002

(65) Prior Publication Data

US 2003/0226403 A1 Dec. 11, 2003

(51) Int. Cl.$^7$ .............................. G01B 7/16; G01L 1/00
(52) U.S. Cl. ...................... 73/779; 73/862.391; 73/828; 280/801.1
(58) Field of Search .................. 73/779, 862.391, 73/828, 159; 280/801.1

(56) References Cited

U.S. PATENT DOCUMENTS

| | | |
|---|---|---|
| 3,618,378 A | 11/1971 | Shull et al. |
| 3,784,972 A | 1/1974 | Hults |
| 3,817,093 A | 6/1974 | Williams |
| 3,868,662 A | 2/1975 | Russell, Jr. |
| 4,278,043 A * | 7/1981 | Heath ................ 116/28 R |
| 4,424,509 A | 1/1984 | Andres et al. |
| 4,574,911 A | 3/1986 | North |
| 4,677,861 A | 7/1987 | Bartholomew |
| 4,742,886 A | 5/1988 | Sato |
| 4,805,467 A | 2/1989 | Bartholomew |
| 4,943,087 A | 7/1990 | Sasaki |
| 4,979,400 A | 12/1990 | Bartholomew |
| 5,060,977 A | 10/1991 | Saito |
| 5,087,075 A | 2/1992 | Hamaue |
| 5,181,739 A | 1/1993 | Bauer et al. |
| 5,309,135 A | 5/1994 | Langford |
| 5,364,129 A | 11/1994 | Collins et al. |

(List continued on next page.)

FOREIGN PATENT DOCUMENTS

WO    WO 99/55559    11/1999

*Primary Examiner*—Edward Lefkowitz
*Assistant Examiner*—Andre Allen
(74) *Attorney, Agent, or Firm*—Scott A. McBain

(57) ABSTRACT

A tension sensing assembly for a seat restraint system in a vehicle includes a sensor plate adapted to be fixed relative to vehicle structure and a movable anchor plate adapted to be connected to belt webbing and movable relative to the sensor plate. The tension sensing assembly also includes a housing mounted to the sensor plate and a movable actuator disposed in the housing. The tension sensing assembly includes at least one spring disposed between the housing and the actuator. The tension sensing assembly further includes at least one magnet and a Hall effect sensor mounted to either one of the housing and the actuator. The anchor plate has a tab portion extending through the housing and cooperable with the actuator to move the actuator to deflect the at least one spring. The actuator moves to change a distance between the at least one magnet and the Hall effect sensor to change an output of the Hall effect sensor to indicate a tension level in the seat restraint system when the at least one spring is deflected.

20 Claims, 1 Drawing Sheet

U.S. PATENT DOCUMENTS

| | | |
|---|---|---|
| 5,454,591 A | 10/1995 | Mazur et al. |
| 5,494,311 A | 2/1996 | Blackburn et al. |
| 5,570,903 A | 11/1996 | Meister et al. |
| 5,570,932 A | 11/1996 | Collins et al. |
| 5,583,476 A | 12/1996 | Langford |
| 5,590,904 A | 1/1997 | Ellis et al. |
| 5,605,348 A | 2/1997 | Blackburn et al. |
| 5,618,056 A | 4/1997 | Schoos et al. |
| 5,636,864 A | 6/1997 | Hori |
| 5,728,953 A | 3/1998 | Beus et al. |
| 5,732,974 A | 3/1998 | Sayles |
| 5,775,618 A | 7/1998 | Krambeck |
| 5,831,172 A | 11/1998 | Kidd |
| 5,871,232 A | 2/1999 | White |
| 5,960,523 A | 10/1999 | Husby et al. |
| 5,965,827 A | 10/1999 | Stanley et al. |
| 5,996,421 A | 12/1999 | Husby |
| 6,081,759 A | 6/2000 | Husby et al. |
| 6,161,439 A | 12/2000 | Stanley |
| 6,209,915 B1 | 4/2001 | Blakesley |
| 6,230,088 B1 | 5/2001 | Husby |
| 6,301,977 B1 | 10/2001 | Stojanovski |
| 6,363,793 B2 | 4/2002 | O'Boyle |
| 6,405,607 B2 * | 6/2002 | Faigle et al. ............ 73/862.391 |
| 6,508,114 B2 * | 1/2003 | Lawson ........................ 73/159 |

\* cited by examiner

TENSION SENSING ASSEMBLY

TECHNICAL FIELD

The present invention relates generally to seat restraint systems for vehicles and, more particularly, to a tension sensing assembly for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

Smart inflatable restraint systems need to know what is occupying a seat of the vehicle. Decisions on deployment of inflatable restraints depend on information supplied by sensors in the seat in determining weight of an object in the seat. When a child seat is placed in the seat and cinched down, the sensors may read a large mass instead of a child seat. With this condition, there will be high tension in the seat restraint system. Comfort studies have shown that no human occupant would wear their seat restraint that tight. With this information on seat restraint tension, the inflatable restraint system can decide on deployment of the inflatable restraints.

Therefore, it is desirable to provide an assembly for sensing tension in a seat restraint system of a vehicle. It is also desirable to provide an assembly for sensing tension in a seat restraint system in a vehicle that allows a control module to determine the difference between either a child seat or a small occupant. It is further desirable to provide an assembly for sensing tension in a seat restraint system in a vehicle that eliminates belt load passing through the sensor and provides an indication of high-tension forces in the seat restraint system. It is still further desirable to provide an assembly for sensing tension in a seat restraint system that can be replaced without replacing the complete buckle assembly. Therefore, there is a need in the art to provide a tension sensing assembly that meets these desires.

SUMMARY OF THE INVENTION

It is, therefore, one object of the present invention to provide a new tension sensing assembly for sensing tension in a seat restraint system of a vehicle.

It is another object of the present invention to provide an assembly for tension sensing in a seat restraint system of a vehicle that eliminates belt load passing through the sensor.

It is yet another object of the present invention to provide an assembly for tension sensing in a seat restraint system of a vehicle that can be replaced without replacing a buckle assembly.

To achieve the foregoing objects, the present invention is a tension sensing assembly for a seat restraint system in a vehicle including a sensor plate adapted to be fixed relative to vehicle structure and a movable anchor plate adapted to be connected to a portion of the seat restraint system and movable relative to the sensor plate. The tension sensing assembly also includes a housing mounted to the sensor plate and a movable actuator disposed in the housing. The tension sensing assembly also includes at least one spring disposed between the housing and the actuator. The tension sensing assembly includes at least one magnet mounted to either one of the actuator and the housing and a Hall effect sensor mounted to either one of the housing and the actuator and cooperable with the at least one magnet. The anchor plate includes a tab portion extending through the housing and cooperable with the actuator to move the actuator to deflect the at least one spring. The actuator moves to change a distance between the at least one magnet and the Hall effect sensor to change an output of the Hall effect sensor to indicate a tension level in the seat restraint system when the at least one spring is deflected.

One advantage of the present invention is that a new tension sensing assembly is provided for a seat restraint system in a vehicle. Another advantage of the present invention is that the tension sensing assembly senses tension in the seat restraint system to help identify what is occupying the seat, either a child, child seat, or low mass adult. Yet another advantage of the present invention is that the tension sensing assembly is non-load bearing by removing a belt load path through a sensor thereof. Still another advantage of the present invention is that the tension sensing assembly allows the sensor to be replaced without replacing a complete buckle assembly. A further advantage of the present invention is that the tension sensing assembly can have angular or offset loading that does not affect operation of the sensor.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
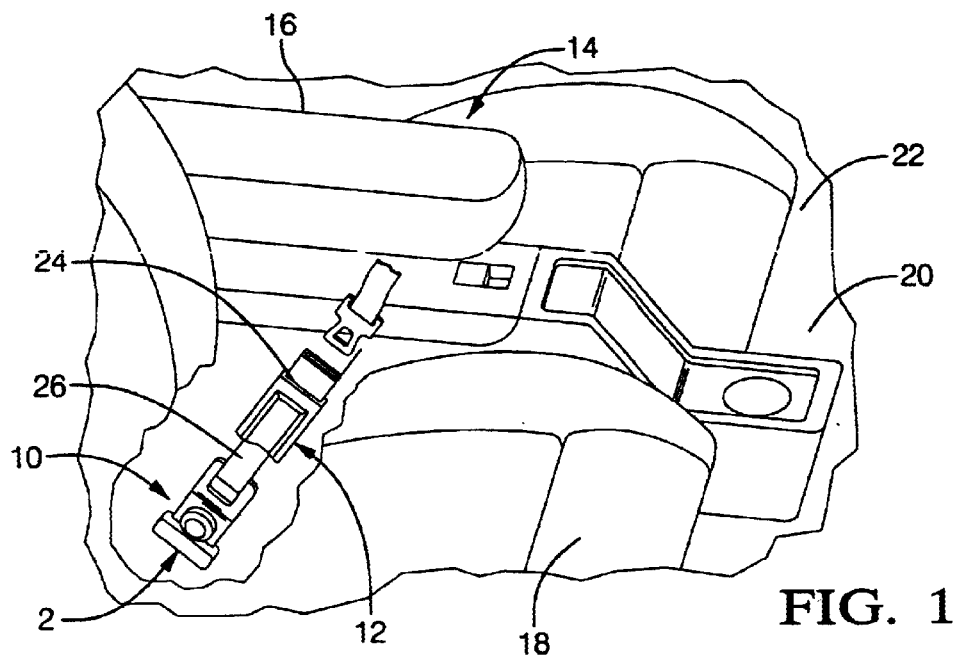
FIG. 1 is a perspective view of a tension sensing assembly, according to the present invention, illustrated in operational relationship with a seat restraint system of a vehicle.

Referring to the drawings and in particular FIG. 1, one embodiment of a tension sensing assembly 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure such as a floorpan 19 (FIG. 3) in an occupant compartment 20 of the vehicle body 16. In this embodiment, the seat 18 is a front seat of the vehicle 14. It should be appreciated that the seat 18 could be a rear, second row, or third row seat for the vehicle 14.

Figure 2:
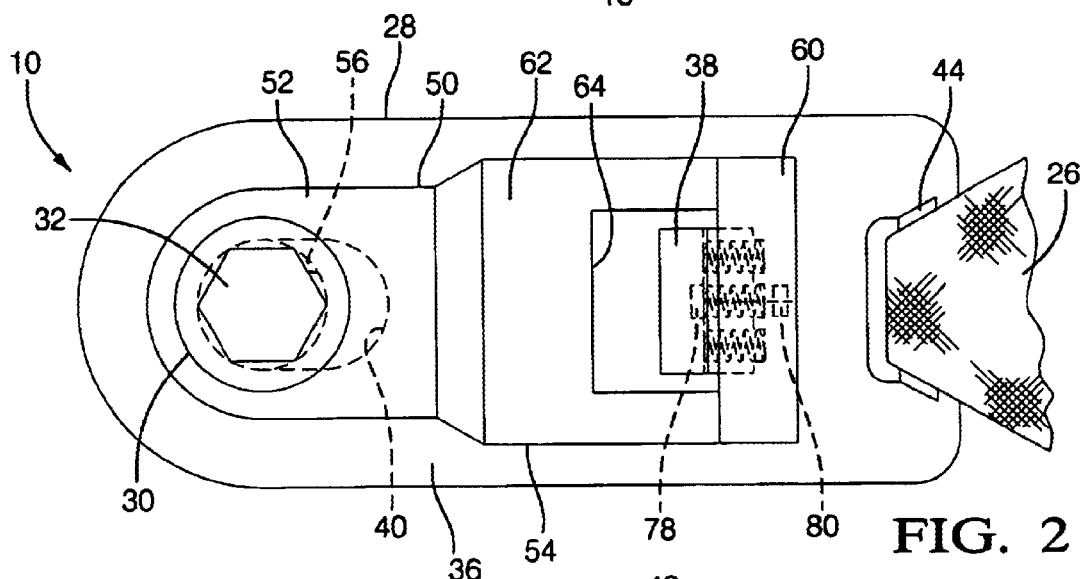
FIG. 2 is a plan view of the tension sensing assembly of FIG. 1.

Referring to FIGS. 1 and 2, the vehicle 14 includes the seat restraint system 12 for restraining an occupant (not shown) in the seat 18. The seat restraint system 12 includes a latch tongue or plate 22 connected to belt webbing 23 at an end of either one of a lap belt, shoulder belt, or both which have another end connected to a retractor (not shown). The seat restraint system 12 also includes a buckle assembly 24 for receiving the latch plate 22. The seat restraint system 12 also includes belt webbing 26 interconnecting the buckle assembly 24 and the tension sensing assembly 10. The tension sensing assembly 10 is connected to the vehicle structure in a manner to be described. It should be appreciated that the belt webbing 26 is one means of transmitting load to the tension sensing assembly 10 and that a swaged cable or loop cable may be used to transmit load to the tension sensing assembly 10. It should also be appreciated that the latch plate 22 is engageable and disengageable with the buckle assembly 24. It should further be appreciated that, except for the tension sensing assembly 10, the seat restraint system 12 and vehicle 14 are conventional and known in the art.

Figure 3:
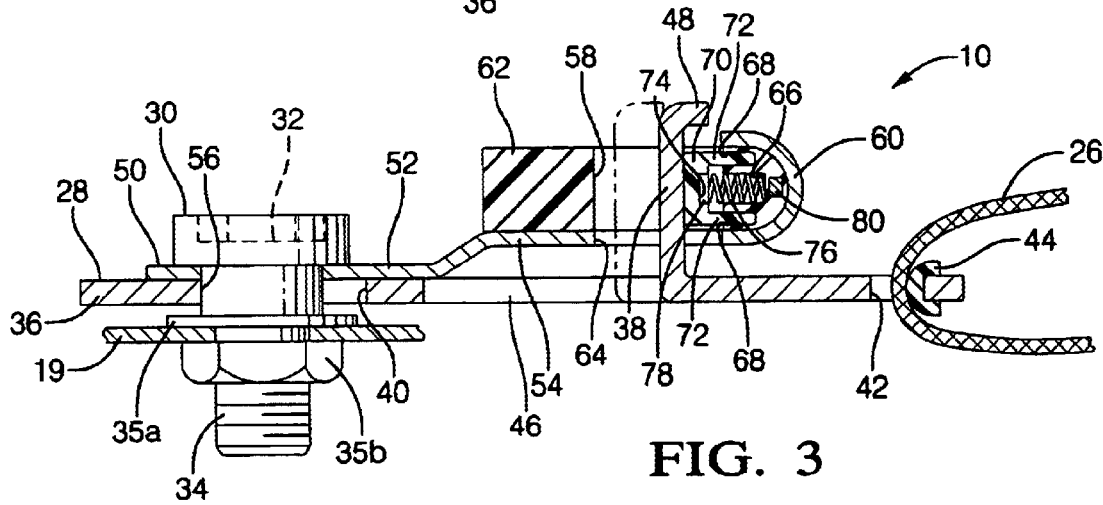
FIG. 3 is a fragmentary elevational view of the tension sensing assembly of FIGS. 1 and 2 illustrating the tension sensing assembly in a low-tension condition and a high-tension condition.

Referring to FIGS. 1 through 3, the tension sensing assembly 10, according to the present invention, includes an anchor plate 28 connected to vehicle structure, such as the floorpan 19, by suitable means such as an anchor bolt 30. The anchor bolt 30 has a head portion 32 extending radially and a shaft portion 34 extending axially from the head portion 32. The shaft portion 34 is generally cylindrical in shape and the head portion 32 is generally circular in shape. The head portion 32 has a diameter greater than a diameter of the shaft portion 34. The shaft portion 34 extends through an aperture 40 to be described in the anchor plate 28 and the vehicle structure such as the floorpan 19 and is secured in place by a washer 35a and a nut 35b. It should be appreciated that the anchor bolt 30 is conventional and known in the art.

The anchor plate 28 has a base portion 36 and a tab portion 38 extending upwardly and generally perpendicular from the base portion 36. The base portion 36 is generally rectangular in shape. The base portion 36 has an elongated aperture or slot 40 extending therethrough and longitudinally to receive the anchor bolt 30. The base portion 36 also includes an aperture 42 extending therethrough and laterally. The aperture 42 is generally rectangular in shape and receives one end of the belt webbing 26 for attaching the belt webbing 26 to the anchor plate 28. It should be appreciated that the aperture 42 in the base portion 36 of the anchor plate 28 receives a portion of the seat restraint system 12. It should also be appreciated that the aperture 42 may receive a swaged cable or loop cable (not shown) in another embodiment of the seat restraint system 12.

The anchor plate 28 may include a webbing protector 44 disposed over a forward longitudinal edge of the aperture 42. The webbing protector 44 has a generally "C" shape and is made of a plastic material. The webbing protector 44 is attached to the anchor plate 28 by suitable means such as press-fitting. It should be appreciated that the base portion 36 is disposed between the head portion 32 of the anchor bolt 30 and the vehicle structure such as the floorpan 19. It should also be appreciated that the anchor plate 28 is movable longitudinally relative to the anchor bolt 30. It should further be appreciated that the aperture 40 provides lost motion between the anchor plate 28 and the anchor bolt 30.

The tab portion 38 is generally rectangular in shape and has a width less than the base portion 36. The tab portion 38 includes a slot 46 extending therearound in the base portion 36. The slot 46 has a generally inverted U" shape. The tab portion 38 extends generally perpendicularly from the slot 46 and has a flange 48 extending longitudinally forward to form a general "C" shape with the base portion 26. The base portion 36 and tab portion 38 are made of a metal material and formed as a monolithic structure being integral, unitary and formed as one-piece.

The tension sensing assembly 10 also includes a sensor bracket or plate 50. The sensor plate 50 has a base portion 52 and a tongue portion 54 extending longitudinally and upwardly from the base portion 52. The base portion 52 is generally rectangular in shape. The base portion 52 also has a width less than the tongue portion 54. The base portion 52 has an aperture 56 extending therethrough to receive the anchor bolt 30. It should be appreciated that the base portion 52 is disposed between the head portion 32 of the anchor bolt 30 and the anchor plate 28. It should also be appreciated that the sensor plate 50 is fixed relative to the anchor bolt 30.

The tongue portion 54 is generally rectangular in shape and has a width greater than the base portion 52. The tongue portion 54 includes a slot 58 extending therethrough. The slot 58 is generally rectangular in shape and allows the tab portion 38 of the anchor plate 28 to extend therethrough. The tongue portion 54 has an end wall 60 extending upwardly at a forward longitudinal end thereof. The end wall 60 is generally arcuate in shape for a function to be described. The base portion 52 and tongue portion 54 are made of a metal material and formed as a monolithic structure being integral, unitary and formed as one-piece.

The tension sensing assembly 10 includes a housing 62 mounted on or connected to the sensor plate 50. The housing 62 is generally rectangular in shape. The housing 62 has a slot 64 extending therethrough. The slot 64 is generally rectangular in shape and is aligned with the slot 58 in the tongue portion 54 of the sensor plate 50. The housing 62 has at least one, preferably a plurality of, more preferably three, spring pockets 66 extending longitudinally and spaced laterally therein. The housing 62 also has a plurality of guide grooves 68 extending longitudinally therein for a function to be described. The housing 62 has a portion disposed between the end wall 60 and the tongue portion 54 of the sensor plate 50. The housing 62 is secured to the sensor plate 50 by suitable means such as an adhesive. The housing 62 is made of a rigid material such as plastic, preferably nylon. It should be appreciated that the housing 62 is a monolithic structure being integral, unitary, and one-piece.

The tension sensing assembly 10 further includes a movable sensor actuator 70 disposed in the slot 64 of the housing 62. The actuator 70 is generally rectangular in shape and has a width less than a width of the slot 64 of the housing 62 for sliding movement therein. The actuator 70 has a plurality, preferably a pair, of spring pockets (not shown) extending longitudinally therein and spaced laterally. The actuator 70 includes a plurality, preferably a pair, of guide flanges 72 extending longitudinally forward and disposed in the guide grooves 68 of the housing 62 for sliding movement therein and to guide the longitudinal movement of the actuator 70. The actuator 70 also has a cavity 74 extending longitudinally therein for a function to be described. The actuator 70 is made of a rigid material such as plastic or metal and formed as a monolithic structure being integral, unitary, and one-piece.

The tension sensing assembly 10 also includes at least one, preferably a plurality of, more preferably three, springs 76 disposed between the housing 62 and the actuator 70. The springs 76 are tuned to a predetermined force for a high-tension condition to have an output of approximately eight pounds (8 lb.) to approximately thirty pounds (30 lb.). The springs 76 are of a coil type having a first end disposed in the spring pockets 66 and contacting the actuator 70 and may be disposed in the spring pockets in the actuator 70. The springs 76 are made of a spring material. It should be appreciated that, when the belt webbing 26 is tensioned, the tab portion 38 deflects the actuator 70 and compresses the springs 76 when the actuator 70 is moved relative to the housing 62 by the tab portion 38. It should also be appreciated that the springs 76 provide a spring load to maintain the anchor plate 28 against the anchor bolt 30. It should further be appreciated that the springs 76 support webbing load.

The tension sensing assembly 10 includes at least one magnet 78 disposed in the cavity 74 of the actuator 70. The magnet 78 is mounted on the actuator 70, preferably molded or die-cast into the actuator 70 and charged during assembly. The tension sensing assembly 10 also includes a Hall effect sensor 80 mounted to the housing 62. The Hall effect sensor 80 is spaced longitudinally from the magnet 78 and is mounted on a printed circuit board (not shown) connected to the housing 62 and is potted or encapsulated and connected by electrical leads or wires (not shown) to a source of power such as a controller (not shown) of the vehicle. The magnet 78 is moved by the actuator 70 relative to the Hall effect sensor 80 during a high-tension condition. It should be appreciated that the actuator 70 moves as the tab portion 38 is moved, deflecting the springs 76, and this motion moves the magnet 78 relative to the Hall effect sensor 80 in a pull-pull arrangement. It should also be appreciated that the position of the magnet 78 relative to the Hall effect sensor 80 changes the output current of the Hall effect sensor 80. It should further be appreciated that the Hall effect sensor 80 may be mounted to the actuator 70 and a plurality of magnets 78 mounted to the housing 62 such that the actuator 70 moves the Hall effect sensor 80 between the magnets 78.

In operation of the tension sensing assembly 10, when the latch plate 22 is not latched with the buckle assembly 24 as illustrated in FIG. 2, no signal is transmitted by the Hall effect sensor 80. It should be appreciated that the actuator 70 of the tension sensing assembly 10 is spring loaded to an initial position by the springs 76.

When the occupant buckles the seat restraint system 12, the tension in the belt webbing 26 is lower than a predetermined load required to deflect the springs 76. In this state, the tension sensing assembly 10 will send a low voltage signal to the controller, causing the controller to determine that a normal or large mass adult is present in the seat 18. It should be appreciated that the seat restraint system 12 is in a low-tension condition as illustrated by the phantom lines in FIG. 3.

When a child seat (not shown) is placed in the seat 18 and the seat restraint system 12 is buckled, the belt webbing 26 is cinched to pull the child seat tightly into the seat 18. As the tension is increased in the belt webbing 26, the contact force on the actuator 70 via the tab portion 38 increases. The resistive force of the springs 76 reacts against the increased tension. When the tension in the belt webbing 26 exceeds the predetermined load, the springs 76 are deflected or compressed, allowing the anchor plate 28 to move relative to the anchor bolt 30 and sensor plate 50. The tab portion 38 moves the actuator 70, thereby moving the magnet 78 relative to the Hall effect sensor 80 in a pull-pull arrangement as illustrated by the solid lines in FIG. 3. This movement changes the output of the Hall effect sensor 80, causing the controller to determine that a child seat is present in the seat 18. It should be appreciated that the seat restraint system 12 is in a high-tension condition as illustrated by the solid lines in FIG. 3. It should also be appreciated that when the tension in the belt webbing 26 is lower than the predetermined load, the springs 76 return the actuator 70 and anchor plate 28 to its original position illustrated by the phantom lines in FIG. 3. It should further be appreciated that an audible tone or visual indication may be provided when the tension in the belt webbing 26 is increased above a predetermined level.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A tension sensing assembly for a seat restraint system in a vehicle comprising:

a sensor plate adapted to be fixed relative to vehicle structure;

a movable anchor plate adapted to be connected to belt webbing of the seat restraint system and movable relative to the sensor plate;

a housing mounted to said sensor plate;

a movable actuator disposed in said housing;

at least one spring disposed between said housing and said actuator;

at least one magnet mounted to either one of said actuator and said housing;

a Hall effect sensor mounted to either one of said housing and said actuator and cooperable with said at least one magnet; and said anchor plate having a tab portion extending through said housing and cooperable with said actuator to move said actuator to deflect said at least one spring, said actuator moving to change a distance between said at least one magnet and said Hall effect sensor to change an output of said Hall effect sensor to indicate a tension level in the seat restraint system when said at least one spring is deflected.

2. A tension sensing assembly as set forth in claim 1 wherein said housing includes at least one spring pocket extending therein to receive one end of said at least one spring.

3. A tension sensing assembly as set forth in claim 1 wherein said housing includes at least one guide slot and said actuator includes at least one guide flange disposed in said at least one guide slot.

4. A tension sensing assembly as set forth in claim 1 wherein said anchor plate has a base portion extending longitudinally and said tab portion extends generally perpendicular to said base portion.

5. A tension sensing assembly as set forth in claim 1 wherein said anchor plate includes at least one elongated aperture extending therethrough.

6. A tension sensing assembly as set forth in claim 5 including an anchor bolt extending through said aperture and adapted to be connected to the vehicle structure.

7. A tension sensing assembly as set forth in claim 1 wherein said sensor plate comprises a base portion extending longitudinally and a tongue portion extending upwardly and longitudinally from said base portion.

8. A tension sensing assembly as set forth in claim 7 wherein said base portion has an aperture extending therethrough to receive said anchor bolt.

9. A tension sensing assembly as set forth in claim 7 wherein said tongue portion has a slot extending therethrough to receive said tab portion.

10. A tension sensing assembly as set forth in claim 1 wherein said at least one magnet is fixed to said actuator and said Hall effect sensor is fixed to said housing.

11. A tension sensing assembly as set forth in claim 1 wherein said at least one spring is a coil spring tuned to a predetermined force.

12. A tension sensing assembly for a seat restraint system in a vehicle comprising:

a movable anchor plate adapted to be connected to belt webbing of the seat restraint system;

a sensor plate disposed on said anchor plate;

an anchor bolt extending through said sensor plate and said anchor plate to fix said sensor plate relative to vehicle structure and allow said anchor plate to move relative to said sensor plate;

a housing mounted to said sensor plate;

a movable actuator disposed in said housing;

at least one spring disposed between said housing and said actuator;

at least one magnet mounted to said actuator;

a Hall effect sensor mounted to said housing and cooperable with said at least one magnet; and said anchor plate having a tab portion extending through said housing and cooperable with said actuator to move said actuator to deflect said at least one spring, said actuator moving said at least one magnet relative to said Hall effect sensor to change an output of said Hall effect sensor to indicate a tension level in the seat restraint system when said at least one spring is deflected.

13. A tension sensing assembly as set forth in claim 12 wherein said anchor plate has a base portion extending longitudinally and said tab portion extends generally perpendicular to said base portion.

14. A tension sensing assembly as set forth in claim 13 wherein said base portion includes at least one elongated aperture extending therethrough, said anchor bolt extending through said at least one elongated aperture.

15. A tension sensing assembly as set forth in claim 12 wherein said sensor plate comprises a base portion extending longitudinally and a tongue portion extending upwardly and longitudinally from said base portion.

16. A tension sensing assembly as set forth in claim 15 wherein said tongue portion has a slot extending therethrough to receive said tab portion.

17. A tension sensing assembly as set forth in claim 12 wherein said housing includes at least one guide slot and said actuator includes at least one guide flange disposed in said at least one guide slot.

18. A tension sensing assembly as set forth in claim 12 wherein said at least one magnet is fixed to said actuator and said Hall effect sensor is fixed to said housing.

19. A tension sensing assembly as set forth in claim 12 wherein said at least one spring is a coil spring tuned to a predetermined force.

20. A seat restraint system for a vehicle comprising:

a belt webbing;

a movable anchor plate connected to said belt webbing;

a sensor plate disposed on said anchor plate;

an anchor bolt extending through said anchor plate and said sensor plate to fix said sensor plate relative to vehicle structure and allow said anchor plate to move relative to said sensor plate;

a housing mounted to said sensor plate;

a movable actuator disposed in said housing;

at least one spring disposed between said housing and said actuator;

at least one magnet mounted to said actuator;

a Hall effect sensor mounted to said housing and cooperable with said at least one magnet; and said anchor plate having a tab portion extending through said housing and cooperable with said actuator to move said actuator to deflect said at least one spring, said actuator moving said at least one magnet relative to said Hall effect sensor to change an output of said Hall effect sensor to indicate a tension level in the seat restraint system when said at least one spring is deflected.

* * * * *